United States Patent
Zhou et al.

(10) Patent No.: US 7,746,432 B2
(45) Date of Patent: Jun. 29, 2010

(54) TRANSFLECTIVE LIQUID CRYSTAL DEVICE HAVING COLOR FILTER ON THIN FILM TRANSISTOR STRUCTURE

(75) Inventors: Wei Zhou, Shenzhen (CN); Li-Juan Huang, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 246 days.

(21) Appl. No.: 11/974,804

(22) Filed: Oct. 16, 2007

(65) Prior Publication Data

US 2008/0088779 A1    Apr. 17, 2008

(30) Foreign Application Priority Data

Oct. 16, 2006    (TW) ............................ 95138080 A

(51) Int. Cl.
*G02F 1/1335* (2006.01)
(52) U.S. Cl. .................. 349/114; 349/106; 349/138
(58) Field of Classification Search .............. 349/114, 349/106, 138, 110, 65, 139
See application file for complete search history.

(56) References Cited

U.S. PATENT DOCUMENTS

| | | | |
|---|---|---|---|
| 6,872,586 B2 * | 3/2005 | Kiguchi et al. | 438/28 |
| 7,019,803 B2 | 3/2006 | Ashida et al. | |
| 7,239,365 B2 | 7/2007 | Chang et al. | |
| 2004/0114074 A1 * | 6/2004 | Yamamoto | 349/113 |
| 2006/0125987 A1 * | 6/2006 | Chang et al. | 349/114 |

FOREIGN PATENT DOCUMENTS

| | | |
|---|---|---|
| CN | 1540393A Y | 10/2004 |
| CN | 1841147A Y | 10/2006 |

* cited by examiner

*Primary Examiner*—Thoi V Duong
(74) *Attorney, Agent, or Firm*—Wei Te Chung

(57) ABSTRACT

An exemplary liquid crystal display device (1) includes a first substrate assembly (14), a second substrate assembly (16) parallel to the first substrate assembly, a liquid crystal layer (18) sandwiched therebetween, and a backlight module (12) adjacent to the first substrate assembly. The first substrate assembly includes a first substrate, a plurality of pixel electrode (145) and a color filter (148). The first substrate includes a plurality of pixel regions. Each pixel region includes a reflection region and a transmission region. The reflection region includes a thin film transistor (TFT) (146) and a reflective layer (147) covering the TFT. The pixel electrodes cover the transmission regions and the reflection regions.

20 Claims, 5 Drawing Sheets

TRANSFLECTIVE LIQUID CRYSTAL DEVICE HAVING COLOR FILTER ON THIN FILM TRANSISTOR STRUCTURE

The present invention relates to transflective liquid crystal display (LCD) devices, and particularly to a transflective liquid crystal display having a color filter on a thin film transistor structure thereof.

BACKGROUND

LCD devices have the advantages of portability, low power consumption, and low radiation, and because of this they have been widely used in various portable information products such as notebooks, personal digital assistants (PDAs), video cameras, and the like. Furthermore, LCD devices are considered by many to have the potential to completely replace CRT (cathode ray tube) monitors and televisions.

Referring to FIG. 6, a typical LCD device 6 is schematically shown. The LCD device 6 includes an LCD panel 60, and a backlight module 62 for illuminating the LCD panel 60. The LCD panel 60 includes a first substrate assembly 64, a second substrate assembly 66 parallel to the first substrate assembly 64, and a liquid crystal layer 65 sandwiched between the two substrate assemblies 64, 66. The backlight module 62 is provided adjacent to the first substrate assembly 64.

Referring also to FIG. 7, the first substrate assembly 64 includes a first transparent substrate 641, a number n (where n is a natural number) of gate lines 642, a number m (where m is also a natural number) of data lines 643, a plurality of thin film transistors (TFTs) 646, and a plurality of pixel electrodes 645.

The gate lines 642 are parallel to each other, each gate line 642 extending along a first direction. The data lines 643 are parallel to each other, each data line 643 extending along a second direction orthogonal to the first direction. The gate lines 642 and the data lines 643 cross each other, thereby defining a plurality of pixel regions 644. The pixel electrodes 645 are disposed in the pixel regions 644, respectively.

Each TFT 646 is provided in the vicinity of a point of intersection of a corresponding gate line 642 and a corresponding data line 643. The TFT 646 includes a gate electrode 647 connected to a corresponding gate line 642, a source electrode 648 connected to a corresponding data line 643, and a drain electrode 649 connected to a corresponding pixel electrode 645.

Referring also to FIG. 8, the second substrate assembly 66 includes a second transparent substrate 661, and a color filter 662 disposed on an inner surface of the second transparent substrate 661 that is nearest to the liquid crystal layer 65. The color filter 662 includes a black matrix 6621 and a color region 6622. The color region 6622 includes a plurality of red filter units, green filter units, and blue filter units arranged in a matrix and separated by the black matrix 6621. The red, green, and blue filter units correspond to the pixel electrodes 645 on the first transparent substrate 641, respectively. The black matrix 6621 spans areas of the second transparent substrate 661 that correspond to the gate lines 642, the data lines 643, and the TFTs 646 of the first transparent substrate 641.

Areas of the LCD device 6 corresponding to the gate lines 642, the date lines 643, and the TFTs 646 cannot display images properly, because no appropriate electric field is generated in those areas. The black matrix 6621 is used to absorb light that transmits through such areas, in order to improve the display quality.

Because the liquid crystal layer 65 does not emit light itself, the LCD device 6 needs the backlight module 62 to illuminating the LCD panel 60. This means the LCD device 6 has relatively high electrical power consumption.

Furthermore, the black matrix 6621 is generally made a little larger than the areas of the LCD device 6 that cannot display images properly, because of positioning tolerances that are needed when the first and second transparent substrates 641, 661 are attached together during manufacture of the LCD device 6. Thus the areas of the red filter units, the green filter units, and the blue filter units are correspondingly reduced in size. As a result, an aperture ratio of the LCD device 6 is correspondingly low. Accordingly, the capability of the LCD device 6 to display good quality images is limited.

What is needed, therefore, is an LCD device that can overcome the above-described deficiencies.

SUMMARY

In one preferred embodiment, a liquid crystal display device includes a first substrate assembly, a second substrate assembly parallel to the first substrate assembly, a liquid crystal layer sandwiched therebetween, and a backlight module adjacent to the first substrate assembly. The first substrate assembly includes a first substrate, a plurality of pixel electrode and a color filter. The first substrate includes a plurality of pixel regions. Each pixel region includes a reflection region and a transmission region. The reflection region includes a thin film transistor (TFT) and a reflective layer covering the TFT. The pixel electrodes cover the transmission regions and the reflection regions.

Other novel features and advantages will become more apparent from the following detailed description of preferred and exemplary embodiments when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments in detail.

Figure 1:
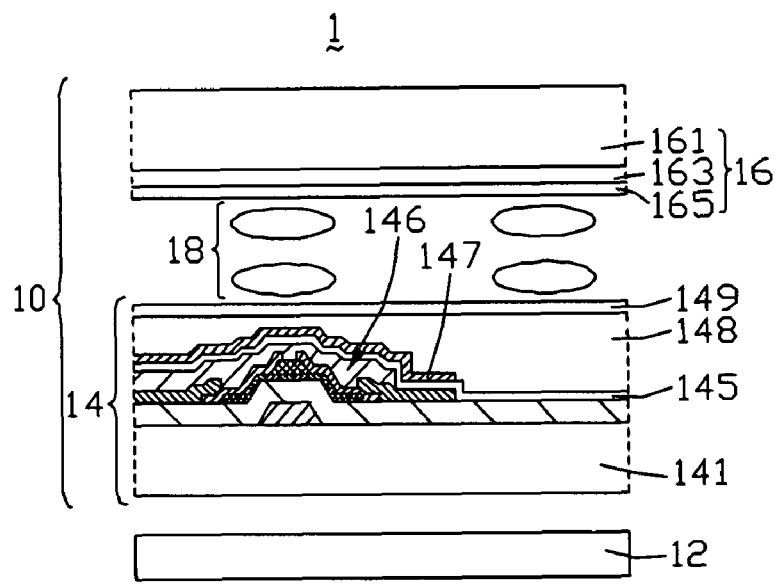
FIG. 1 is a side, cross-sectional view of part of an LCD device according to a first embodiment of the present invention, the LCD device including a first substrate assembly and a second substrate assembly.

Referring to FIG. 1, a liquid crystal display (LCD) device 1 according to a first embodiment of the present invention is shown. The LCD device 1 includes an LCD panel 10, and a backlight module 12 disposed at a bottom side of the LCD panel 10. The LCD panel 10 includes a first substrate assembly 14, a second substrate assembly 16 parallel to the first substrate assembly 14, and a liquid crystal layer 18 sandwiched between the two substrate assemblies 14, 16. The backlight module 12 is disposed adjacent to the first substrate assembly 14.

Figure 2:
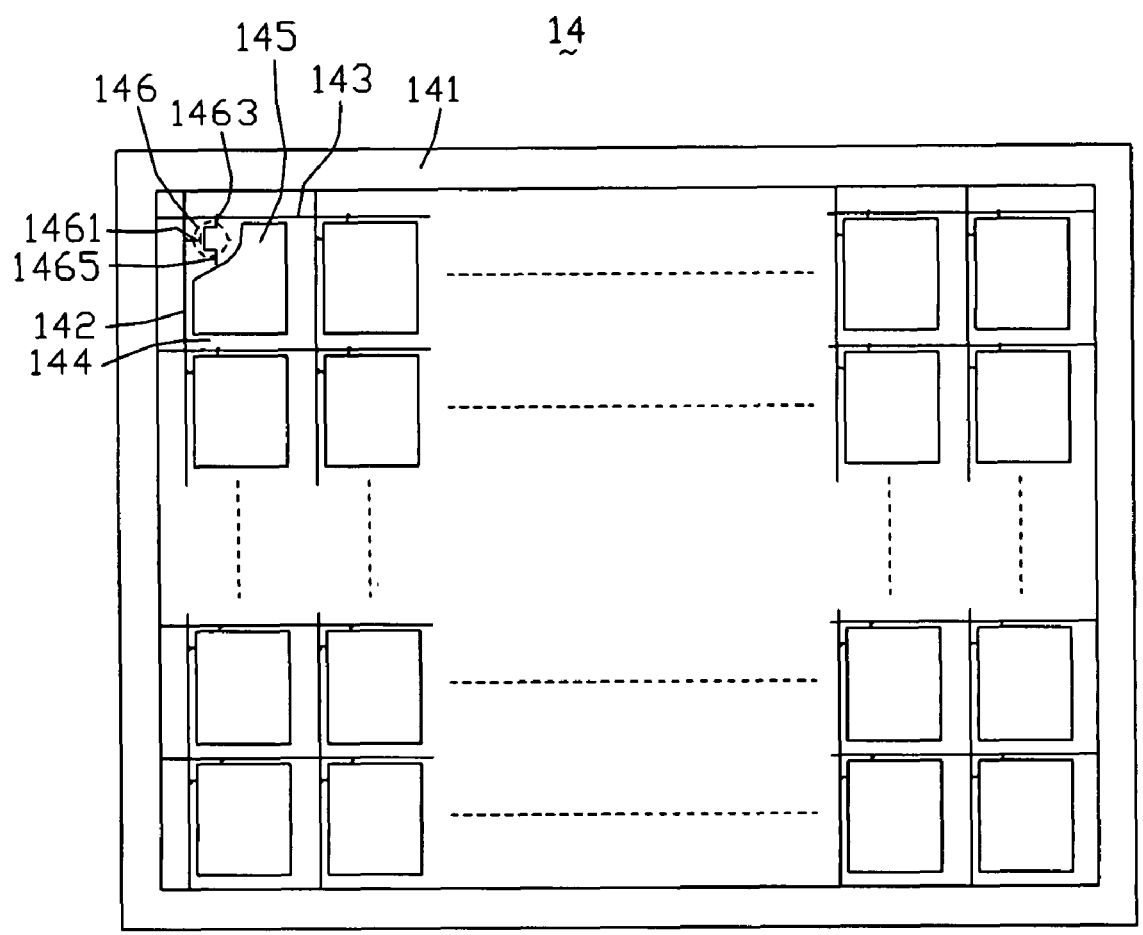
FIG. 2 is an abbreviated, top plan view of lower level portions of the first substrate assembly of FIG. 1, shown in isolation.

Referring also to FIG. 2, the first substrate assembly 14 includes a first transparent substrate 141, a number n (where n is a natural number) of gate lines 142, a number m (where m is also a natural number) of data lines 143, a plurality of pixel electrodes 145, a plurality of thin film transistors (TFTs) 146, a reflective layer 147, a color filter 148, and a first alignment film 149.

The gate lines 142 are provided on or at an inner surface of the first transparent substrate 141. The gate lines 142 are parallel to each other, with each gate line 142 extending along a first direction. The data lines 143 are provided on or at the inner surface of the first transparent substrate 141. The data lines 143 are parallel to each other, with each data line 143 extending along a second direction that is orthogonal to the first direction. The gate lines 142 and the data lines 143 cross each other, thereby defining a plurality of pixel regions 144 arranged in a matrix. Each pixel region 144 includes one TFT 146 and one pixel electrode 145.

The TFTs 146 are provided in the vicinity of points of intersection of gate lines 142 and data lines 143, respectively. Each TFT 146 includes a gate electrode 1461 connected to a corresponding gate line 142, a source electrode 1463 connected to a corresponding data line 143, and a drain electrode 1465 connected to a corresponding pixel electrode 145. The pixel electrode 145 covers the TFT 146 and the first transparent substrate 141. The reflective layer 147 covers a part of the pixel electrode 145 including a region corresponding the TFT 146. A sub-region of the pixel region 144 that corresponds to the reflective layer 147 is defined as a reflection region. Another sub-region of the pixel region 144 is defined as a transmission region.

The color filter 148 is disposed on the reflective layer 147 and the pixel electrodes 145. The first alignment film 149 is disposed on the color filter 148.

Figure 3:
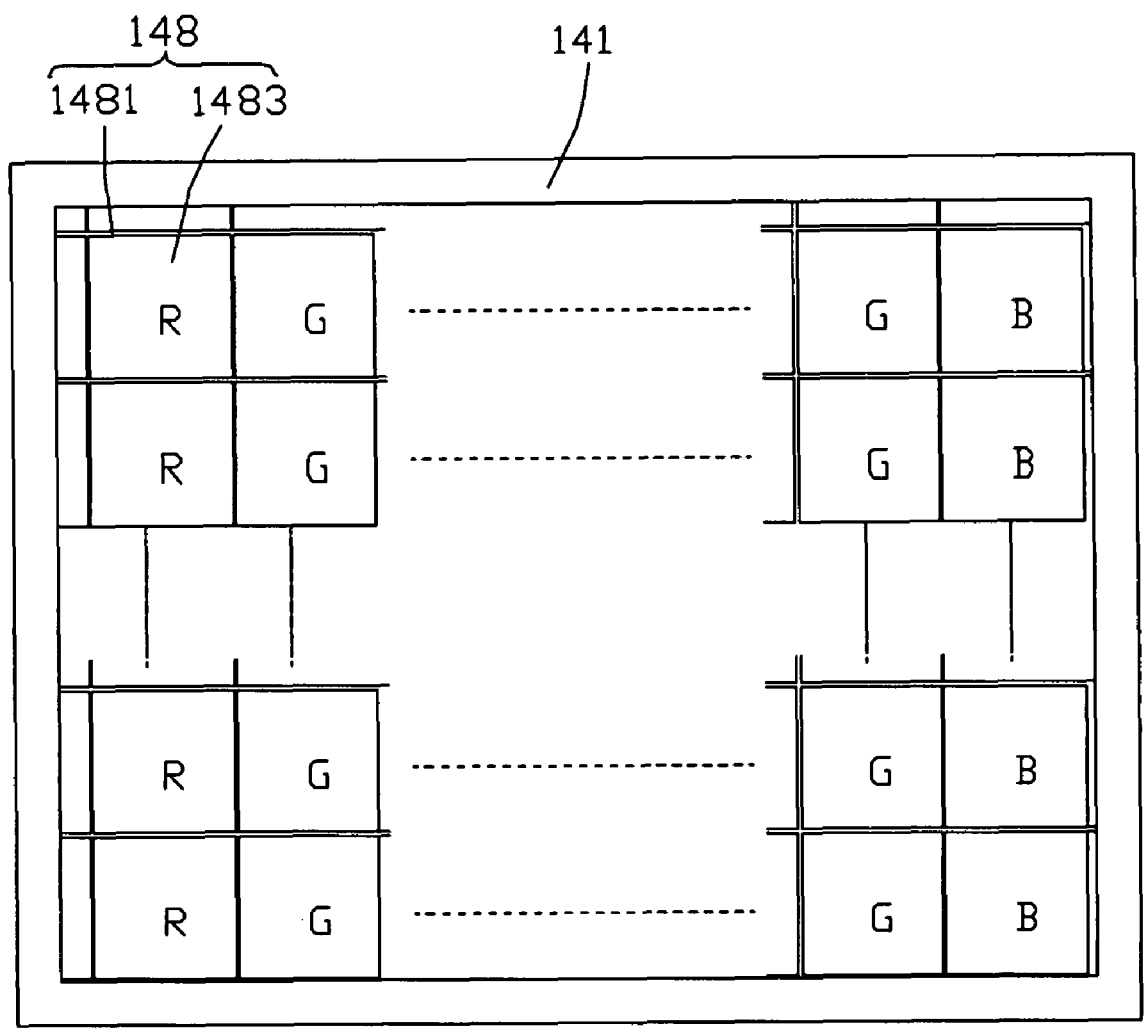
FIG. 3 is an abbreviated, top plan view of a color filter of the first substrate assembly of FIG. 1, shown in isolation.

Referring also to FIG. 3, the color filter 148 includes a black matrix 1481 and a color region 1483. The color region 1483 includes a plurality of red filter units, green filter units, and blue filter units separated by the black matrix 1481. The red, green, and blue color filter units cover areas that correspond to the pixel electrodes 145, respectively. The black matrix 1481 covers areas that correspond to the gate lines 142 and the data lines 143.

The second substrate assembly 16 includes a second transparent substrate 161, a common electrode 163, and a second alignment film 165. The common electrode 163 and the second alignment film 165 are disposed on an inner surface of the second transparent substrate 161, in that sequence from top to bottom. An electric field is generated between the common electrode 163 and the pixel electrodes 145 when corresponding voltages are applied thereto. Thereby, liquid crystal molecules of the liquid crystal layer 18 are twisted accordingly.

When ambient light is insufficient, the LCD device 1 uses the backlight module 12 to provide light. The light from the backlight module 12 transmits through the first transparent substrate 141, the pixel electrodes 145, the color filter 148, the liquid crystal layer 18 corresponding to the transmission regions, and the second substrate assembly 16 in sequence, and then emits from a top surface of the second transparent substrate 161. Thereby, the LCD device 1 provides images (or text) for viewing. When ambient light is sufficient, the LCD device 1 does not use the backlight module 12. Ambient light transmits through the second substrate assembly 16, the liquid crystal layer 18 corresponding to the reflection regions, and the color filter 148 in sequence, and then reaches the reflective layer 147. The light is reflected by the reflective layer 147, and transmits back through the color filter 148, the liquid crystal layer 18 corresponding to the reflection regions, and the second substrate assembly 16. Then the light emits from the top surface of the second transparent substrate 161, whereby the LCD device 1 provides images (or text) for viewing.

Unlike with a conventional transmissive LCD device, the LCD device 1 can utilize ambient light to display images. Therefore the electrical power consumption of the LCD device 1 is reduced. Furthermore, because the color region 1483 covers both the transmission regions and the reflection regions, and the color filter 148 and pixel electrodes 145 are both provided at the first substrate assembly 14, essentially no positioning tolerances are needed as between the color region 1483 and the pixel electrodes 145. Therefore areas of the black matrix 1481 substantially or even exactly correspond to the areas of the gate lines 142 and data lines 143, and an area of the color region 1483 is an optimum large area. This means an aperture ratio of the LCD device 1 is optimized. Accordingly, a display quality of the LCD device 1 is enhanced.

Figure 4:
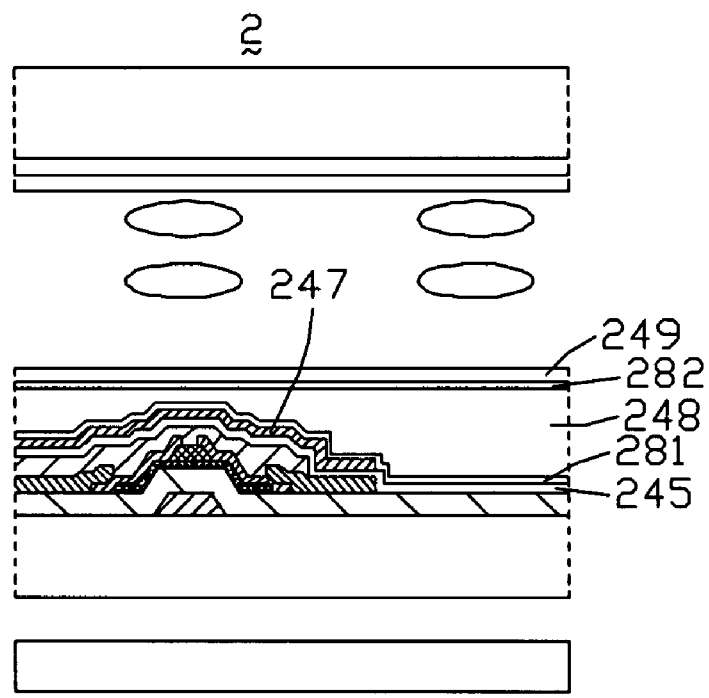
FIG. 4 is a side, cross-sectional view of part of an LCD device according to a second embodiment of the present invention.

Referring to FIG. 4, an LCD device 2 according to a second embodiment of the present invention is similar to the LCD device 1. However, the LCD device 2 further includes a first insulation layer 281 disposed on a reflective layer 247 and a plurality of pixel electrodes 245, and a second insulation layer 282 disposed between a color filter 248 and a first alignment film 249. The two insulation layers 281, 282 are used to protect the color filter 248.

Figure 5:
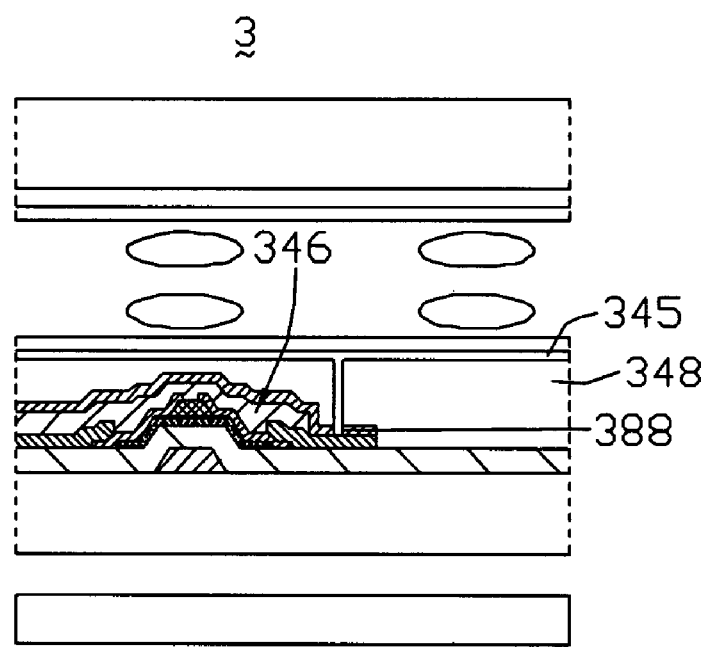
FIG. 5 is a side, cross-sectional view of part of an LCD device according to a third embodiment of the present invention.
Figure 6:
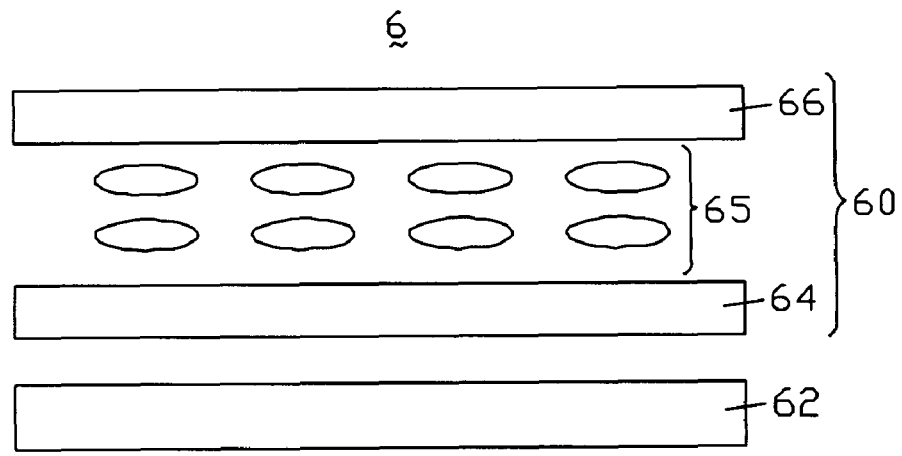
FIG. 6 is a side, cross-sectional view of a conventional LCD device, the LCD device including a first substrate assembly and a second substrate assembly.
Figure 7:
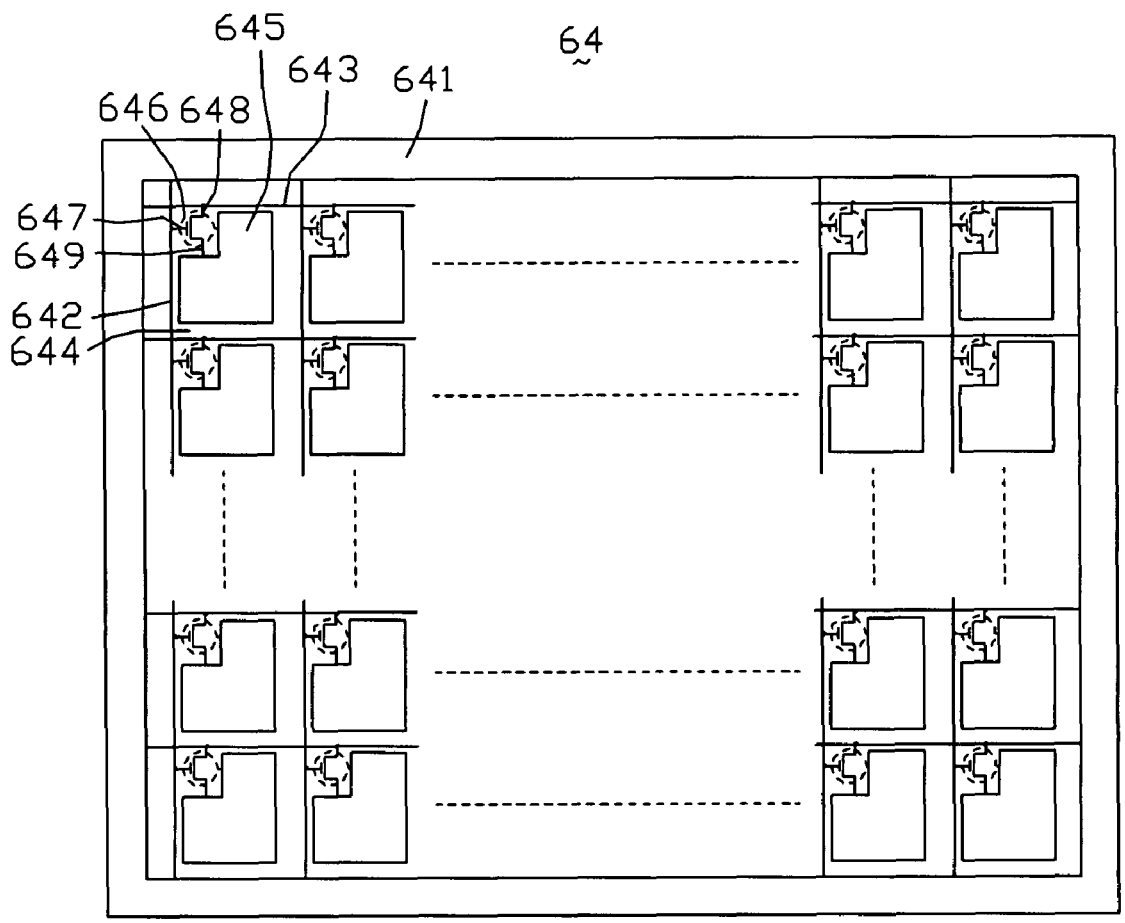
FIG. 7 is an abbreviated, top plan view of the first substrate assembly of FIG. 6, shown in isolation.
Figure 8:
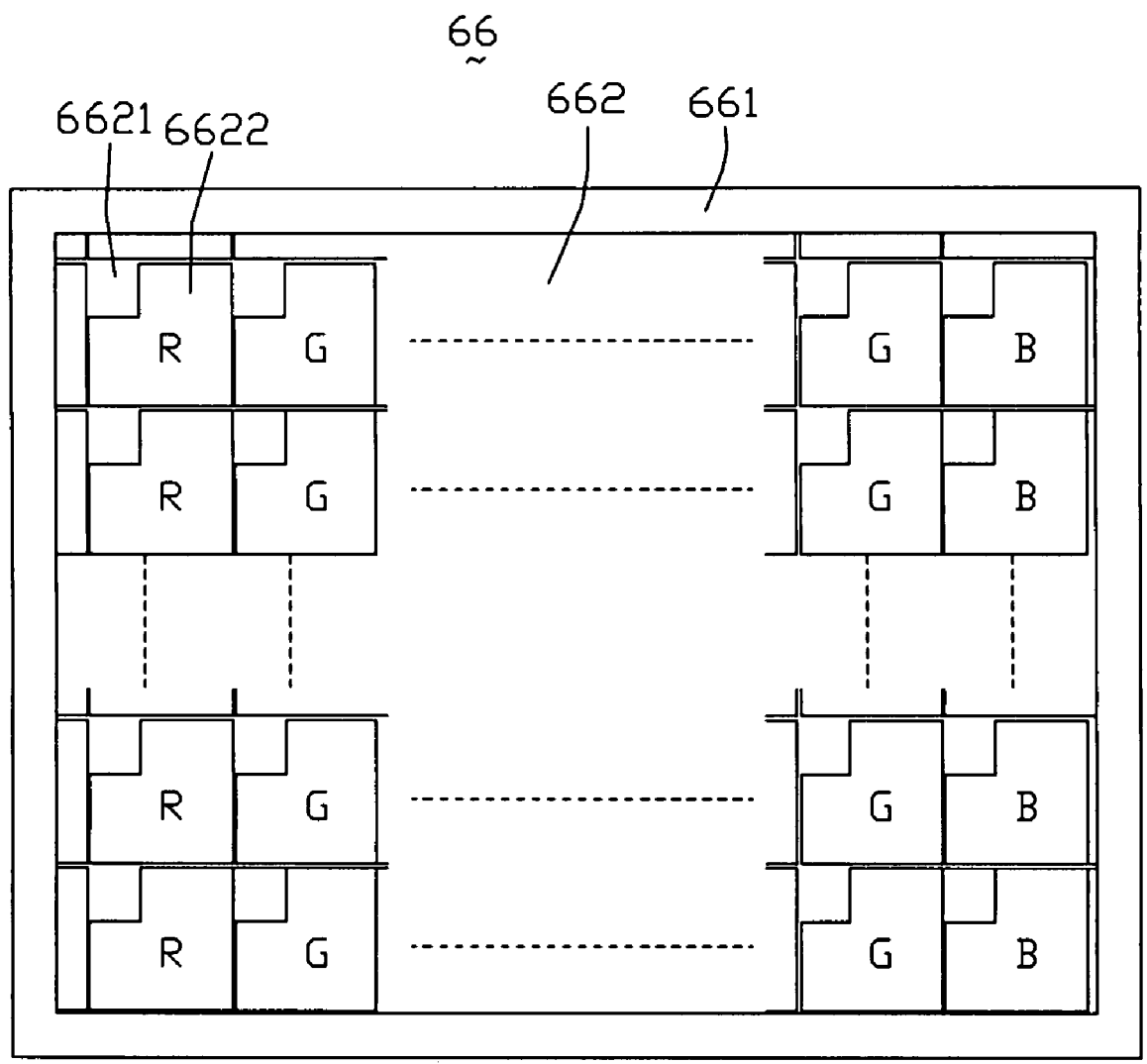
FIG. 8 is an abbreviated, top plan view of the second substrate assembly of FIG. 6.

Referring to FIG. 5, an LCD device 3 according to a third embodiment of the present invention is similar to the LCD device 1. However, in the LCD device 3, a plurality of pixel electrodes 345 are disposed on the color filter 348. The pixel electrodes 345 are connected with corresponding drain electrodes of TFTs 346 through a plurality of corresponding contact holes 388.

Further or alternative embodiments may include the following. In one example, a reflective layer covers TFTs, and an area of the reflective layer is configured according to display requirements of the transmission region and the reflection region. In another example, a thickness of a reflective layer can be half that of a color filter, so that in both the transmission regions and the reflection regions, the light transmits through a same thickness of pigment in the color filter. Thus the display quality of the LCD device can be improved.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A transflective liquid crystal display device, comprising:
   a first substrate assembly, comprising:
      a first substrate comprising a plurality of pixel regions each of which defines a transmission region and a reflection region, the reflection region comprising a thin film transistor (TFT) and a reflective layer, the reflective layer covering the TFT;
      a plurality of pixel electrodes covering the transmission regions and the reflection regions, the pixel electrodes provided on inner surfaces of the TFTs and the first substrate, and electrically connected with the TFTs respectively, the reflective layer provided on a part of an inner surface of each of the pixel electrodes;

a color filter provided on inner surfaces of the reflective layers and the parts of the inner surfaces of the pixel electrodes; and a first insulation layer provided between the reflective layers and the color filter and between the pixel electrodes and the color filter;

a second substrate assembly parallel to the first substrate assembly;

a liquid crystal layer sandwiched between the first substrate assembly and the second substrate assembly; and a backlight module adjacent to the first substrate assembly.

2. The transflective liquid crystal display device as claimed in claim 1, wherein the first substrate assembly further comprises a second insulation layer provided on an inner surface of the color filter.

3. The transflective liquid crystal display device as claimed in claim 1, wherein the first substrate assembly further comprises a plurality of parallel gate lines, and a plurality of parallel data lines crossing the gate lines, the gate lines and the data lines thereby cooperatively defining the pixel regions.

4. The transflective liquid crystal display device as claimed in claim 3, wherein the color filter comprises a color region and a black matrix, and the black matrix substantially or exactly corresponds to the gate lines and the data lines.

5. The transflective liquid crystal display device as claimed in claim 4, wherein the color region comprises a plurality of red filter units, a plurality of green filter units, and a plurality of blue filter units arranged in a matrix and separated by the black matrix, and the red, green, and blue filter units correspond to the pixel regions, respectively.

6. The transflective liquid crystal display device as claimed in claim 5, wherein the second substrate assembly comprises a second substrate, and a common electrode provided at an inner surface of the second substrate.

7. The transflective liquid crystal display device as claimed in claim 1, wherein the first substrate assembly further comprises a first alignment film provided on an inner surface of the color filter.

8. The transflective liquid crystal display device as claimed in claim 7, wherein the first substrate assembly further comprises a second insulation layer provided between the first alignment film and the color filter.

9. The transflective liquid crystal display device as claimed in claim 1, wherein a thickness of the reflective layer is half a thickness of the color filter.

10. A transflective liquid crystal display device, comprising:

a first substrate assembly, comprising:

a first substrate comprising a plurality of pixel regions, each of which defines a transmission region and a reflection region, the reflection region comprising a thin film transistor (TFT) and a reflective layer, the reflective layer covering the TFT;

a plurality of pixel electrodes covering the transmission regions and the reflection regions, the pixel electrodes provided on inner surfaces of the TFTs and the first substrate, and electrically connected with the TFTs respectively, the reflective layer provided on a part of an inner surface of each of the pixel electrodes;

a color filter provided on inner surfaces of the reflective layers and the parts of the inner surfaces of the pixel electrodes; and a first insulation layer provided between the reflective layers and the color filter and between the pixel electrodes and the color filter;

a second substrate assembly parallel to the first substrate assembly; and a liquid crystal layer sandwiched between the first substrate assembly and the second substrate assembly.

11. The transflective liquid crystal display device as claimed in claim 10, wherein the first substrate assembly further comprises a first alignment film provided on an inner surface of the color filter.

12. The transflective liquid crystal display device as claimed in claim 11, wherein the first substrate assembly further comprises a second insulation layer provided between the first alignment film and the color filter.

13. The transflective liquid crystal display device as claimed in claim 10, wherein the first substrate assembly further comprises a plurality of parallel gate lines, and a plurality of parallel data lines crossing the gate lines, the gate lines and the data lines thereby cooperatively defining the pixel regions, the color filter comprises a color region and a black matrix, and the black matrix substantially or exactly corresponds to the gate lines and the data lines.

14. The transflective liquid crystal display device as claimed in claim 10, wherein a thickness of the reflective layer is half a thickness of the color filter.

15. A transflective liquid crystal display device, comprising:

a first substrate assembly, comprising:

a first substrate comprising a plurality of parallel gate lines, and a plurality of parallel data lines crossing the gate lines, the gate lines and the data lines thereby cooperatively defining a plurality of pixel regions, each pixel region comprising a thin film transistor (TFT), a reflective layer and a pixel electrode, the pixel electrode comprising a first region overlapping the TFT and a second region overlapping the first substrate, the reflective layer overlapping the first region of the pixel electrode, and the pixel electrode electrically connected with the TFT;

a first insulation layer provided on inner surfaces of the reflective layers and inner surfaces of the second regions of the pixel electrodes; and a color filter provided on an inner surface of the first insulation layer;

a second substrate assembly parallel to the first substrate assembly; and a liquid crystal layer sandwiched between the first substrate assembly and the second substrate assembly.

16. The transflective liquid crystal display device as claimed in claim 15, wherein the first substrate assembly further comprises a first alignment film provided on an inner surface of the color filter.

17. The transflective liquid crystal display device as claimed in claim 16, wherein the first substrate assembly further comprises a second insulation layer provided between the first alignment film and the color filter.

18. The transflective liquid crystal display device as claimed in claim 15, wherein the color filter comprises a color region and a black matrix, and the black matrix substantially or exactly corresponds to the gate lines and the data lines.

19. The transflective liquid crystal display device as claimed in claim 18, wherein the second substrate assembly comprises a second substrate, and a common electrode provided at an inner surface of the second substrate.

20. The transflective liquid crystal display device as claimed in claim 15, wherein a thickens of the reflective layer is half thickness of the color filter.

* * * * *